(12) United States Patent
Chen et al.

(10) Patent No.: US 12,448,294 B2
(45) Date of Patent: Oct. 21, 2025

(54) LOW THERMAL CONDUCTIVITY AND LOW-K DIELECTRIC AEROGEL MATERIAL AND PREPARATION METHOD THEREFOR

(71) Applicant: Taiwan Aerogel Technology material Co., Ltd., Tainan (TW)

(72) Inventors: Jean-Hong Chen, Tainan (TW); Shiu-Shiu Chen, Tainan (TW)

(73) Assignee: Taiwan Aerogel Technology Material Co., Ltd., Tainan (TW)

( * ) Notice: Subject to any disclaimer, the term of this patent is extended or adjusted under 35 U.S.C. 154(b) by 786 days.

(21) Appl. No.: 17/731,789

(22) Filed: Apr. 28, 2022

(65) Prior Publication Data

US 2023/0348284 A1  Nov. 2, 2023

(51) Int. Cl.
*C01B 33/158* (2006.01)
*C01B 33/145* (2006.01)
(Continued)

(52) U.S. Cl.
CPC ........ *C01B 33/1585* (2013.01); *C01B 33/145* (2013.01); *C01B 33/148* (2013.01);
(Continued)

(58) Field of Classification Search
CPC .............. C01B 33/1585; C01B 33/145; C01B 33/148; C01B 33/155; C08J 5/248; C08J 2363/00; C08J 2379/08; F16L 59/06
See application file for complete search history.

(56) References Cited

U.S. PATENT DOCUMENTS 10,639,606 B2 * 5/2020 Chen ...................... C01B 33/159
2017/0218160 A1 * 8/2017 Bertino ................ B01J 13/0091
(Continued)

FOREIGN PATENT DOCUMENTS

| KR | 20070114668 A | * | 12/2007 | ......... C01B 33/1585 |
| TW | I717257 B | * | 1/2021 | |
| WO | WO-2015016730 A2 | * | 2/2015 | .............. C02F 1/288 |
| WO | WO-2022025341 A1 | * | 2/2022 | ................ C08J 9/28 |

OTHER PUBLICATIONS

Xiaoguang Yang, Yantao Sun, Duoqi Shi, Jinlong Liu, "Experimental investigation on mechanical properties of a fiber-reinforced silica aerogel composite," Materials Science and Engineering: A, vol. 528, Issues 13-14, 2011, pp. 4830-4836. (Year: 2011).*

(Continued)

*Primary Examiner* — Xiao S Zhao
*Assistant Examiner* — Inja Song
(74) *Attorney, Agent, or Firm* — Troutman Pepper Locke LLP; Tim Tingkang Xia, Esq.

(57) ABSTRACT

The present invention discloses the an aerogel material featuring of low thermal conductivity, low dielectric constant (low-$D_K$) and low dielectric-loss (low-$D_F$) and a preparation method therefor. The method comprises steps of: (1) mix and hydrolysis, (2) dispersion and condensation, (3) molding, and (4) drying. The prepared pure aerogel or fiber/aerogel composite is further processed by steps of: (5) polymer solution impregnating, (6) solvent drying and (7) crosslinking-solidifying to obtain a polymer/aerogel composite or a polymer/fiber/aerogel composite featuring of high strength, low thermal conductivity, low-$D_K$ and low-$D_F$. The method provided by the present invention does not involve highly conductive solvents or additives, and a highly porous structure is formed so that the dielectric constant and dielectric loss of the aerogel material are significantly reduced, suitable for 5G communications, microwave circuits, protection and insulation for electric vehicle lithium battery modules.

13 Claims, 6 Drawing Sheets

(51) Int. Cl.
  *C01B 33/148* (2006.01)
  *C01B 33/155* (2006.01)
  *C08J 5/24* (2006.01)
  *F16L 59/06* (2006.01)

(52) U.S. Cl.
  CPC ............ *C01B 33/155* (2013.01); *C08J 5/248* (2021.05); *F16L 59/06* (2013.01); *C08J 2363/00* (2013.01); *C08J 2379/08* (2013.01)

(56) References Cited

U.S. PATENT DOCUMENTS

2019/0143400 A1* 5/2019 Golfetto ............... B01D 3/00
                                                            164/34
2020/0345882 A1* 11/2020 Kim ........................ C08L 5/04

OTHER PUBLICATIONS

Teresa Linhares, Maria T. Pessoa de Amorim, Luisa Durães, "Silica aerogel composites with embedded fibres: a review on their preparation, properties and applications," J. Mater. Chem. A, 2019, 7, 22768-22802. (Year: 2019).*

Jie Li, Yu Lei, Dingding Xu, Fenghua Liu, Junwan Li, Aihua Sun, Jianjun Guo, Gaojie Xu, "Improved mechanical and thermal insulation properties of monolithic attapulgite nanofiber/silica aerogel composites dried at ambient pressure," J. Sol-Gel Sci. Technol., 2017, 82, 702-711. (Year: 2017).*

English translation of TW-I717257-B by EPO. (Year: 2021).*
English translation of WO-2022025341-A1. (Year: 2007).*
English translation of KR-20070114668-A. (Year: 2007).*

* cited by examiner

LOW THERMAL CONDUCTIVITY AND LOW-K DIELECTRIC AEROGEL MATERIAL AND PREPARATION METHOD THEREFOR

BACKGROUND

Field of Invention

The present invention is related to an aerogel composite, especially related to a aerogel material featuring of low thermal conductivity, low dielectric constant and low dielectric loss, and a method for making thereof.

Description of Related Art

Dielectric property of the known applied material decreases significantly with increase of internal porosity of the material, and thus aerogel material and related composite will be required as low $D_K$ applied product for security of 5G rapid transmit and lithium battery module. Generally acknowledged, aerogel is a multi-porous material with three dimensional network structure, the porosity is higher than 80% (even higher than 95%), low density, high specific surface area, low thermal conductivity, which renders aerogel or composite thereof an ideal material for security of low $D_K$ technology such as rapid transmit, electric automobile signal transmitting or lithium battery module.

Due to a large amount of porosity and extreme low density of aerogel or composite thereof, aerogel is quite valuable for low $D_K$ application such as heat insulation, fireproof, low-resistant signal transmit or electric shock tolerance. Upon moving forwards an era of 5G as well as electric car or autonomous electric car, application of high frequency transmit urgently requires dielectric material possessing properties of low $D_K$ ($D_K$<2.5), low signal loss ($D_F$<0.003) and high electric shock tolerance. Based on basic material theory, internal porosity of material would significantly downgrade electron or electronic hole transmitting. Therefore, the more porous the structure of inorganic or organic material is, the lower the dielectric property would be. For the reasons mentioned above, 5G high frequency applications and electric autonomous automobile require multi-porous material as primary base material.

Disclosed in Japanese Pat. No. 8-228105 is a method for making semiconductor equipment. The method comprises forming wet gel thin film on a base material and vaporizing the solvent that immerses the wet gel thin film through supercritical drying and sub-supercritical drying processes so as to form aerogel thin film. The dried aerogel thin film remains network structure of wet gel thin film which is a multi-porous material with high porosity and low dielectric constant. Thus, the aerogel could serve as a novel material for dielectric layer and internal insulator layer. However, several drawbacks shall be concerned when a supercritical or sub-supercritical drying process is included as part of semiconductor processing, which results in complication of manufacturing process and higher expense over equipment.

"Supercritical drying" implies that water and organic solvent demonstrate supercritical status under high temperature and high pressure. The organic solvent and water exhibit gas-liquid mixed property at meantime, and the solvent is directly vaporized under supercritical status and dried. Consequently, shrinkage of wet gel could be prevented when trace solvent is removed from network structure on supercritical condition. Nonetheless, during semiconductor manufacturing, time required for low $D_K$ thin film solution preparation to coating is inconstant. Furthermore, during condensation of aerogel solution, silicon molecules coagulate immediately, which prompts viscosity of aerogel solution to increase with time. While roll coating is performed at a constant rate, thickness of coating upon the base material would be increased as the roll coating continues. Similarly, thickness of semiconductor thin film structure would eventually vary as timespan of processing increases so that semiconductor thin film structure of high quality could not be made.

Traditionally, a method for making aerogel is a sol-gel process. It is performed by mixing precursors such as alkoxysilane, tetramethoxysilane or waterglass with a large amount of organic mixing solvent, and then an acid catalyst is added to initiate hydrolysis. After hydrolysis reacts for specific time, a base catalyst is added to induce condensation, and during condensation a sol would be gradually formed. Molecules inside the sol continue to react and bonds with each other to form a half-solidified polymeric gel. Subsequently, the gel undergoes aging for a specific time to stabilize the three dimensional network structure of the gel. Finally, solvent displacement is performed by using hydrophobic solvent such as n-Butanol, n-hexanol, n-hexane or cyclohexane. The solvent in gel structure is then dried by supercritical drying. Traditional processing not only consumes a large amount of expensive organic solvent and requires supercritical equipment, but also requires lots of time for solvent displacement by using hydrophobic solvent. Therefore manufacturing aerogel by a traditional method is both cost ineffective and time-consuming.

On the other hand, methods for making hydrophobic aerogel also utilize sol-gel processing. The method comprises primarily mixing methylsiloxane precursors such as methyltrimethoxysilane (MTMS) or methyltriethoxysilane (MTES) with an organic solvent, and adding base catalyst for hydrolysis. After a specific time of hydrolysis, a condensation is carried out so as to form a sol progressively. Molecules inside the sol continue to react and bond with each other to form a half-solidified polymeric gel. Subsequently, the gel undergoes aging for a specific time, and solvent displacement is performed by using hydrophobic solvent such as n-Butanol, n-hexanol, n-hexane or cyclohexane for 2 to 3 days. The hydrophobic aerogel forms a stabilized three dimensional network structure.

Large amount of hydrophobic solvent is used by processing mentioned above. Taking alkanes for example, multiple times of solvent displacement are performed for 2 to 3 days. To avoid shrinkage or cracking of aerogel structure, induced by surface tension of water molecule, during drying under atmospheric pressure, supercritical drying or high temperature drying under atmospheric pressure is applied. Nevertheless, multiple times of hydrophobic solvent displacement as well as supercritical drying technology are quite time-consuming and expensive, which undermines competitivity of massive production and application in the future.

Disclosed in U.S. Pat. No. 8,945,677B2 is an ELECTRONIC DEVICE MANUFACTURE USING LOW-K DIELECTRIC MATERIALS, in which low-K materials are used for manufacturing electronic device or semiconductor element. A method for manipulating properties of dielectric materials as well as entire system is provided in this patent. Specifically, a polyimide pre-sol, a catalyst and a polar solvent are mixed to obtain a sol mixture layer, and then sol ingredients are crosslinked to form a wet-gel material. A supercritical method is used for removing solvent so as to form a polyimide aerogel thin film. Such technique combines polyimide aerogel thin film with a nonporous and low-K substrate. Supercritical fluid technique featuring cyclic pressurizing is applied for removing solvent in order to make electronic device with low-K materials, which renders the entire process time-consuming and cost-ineffective.

Disclosed in Chinese Pat. No. CN102044525A is a LOW-K DIELECTRIC LAYER STRUCTURE, SEMICONDUCTOR DEVICE STRUCTURE AND FORMATION METHOD THEREOF, in which silicon carbide is used for low-K dielectric layer formation. A semiconductor device and a formation method for making thereof is provided in this patent, wherein the formation method comprises forming a silicon carbide aerogel in the space between the interconnection structures as a low-K dielectric layer. Tetraethyl orthosilicate (TEOS) or tetramethyl orthosilicate (TMOS) is used as a material to form the low-K dielectric layer structure. On the other hand, drying at room temperature or multiple times of supercritical fluid technique is applied for preparation of low-K dielectric film. The entire process is not only time-consuming but also cost-ineffective.

Disclosed in Chinese Pat. No. CN105189104A is AEROGEL INSULATION PANELS AND MANUFACTURING THEREOF, in which polyimide aerogel is prepared into insulation panels and the panels can be applied as laminated panels in aerospace field. The panels comprises a polyimide aerogel surface layer and a reflection protecting layer on the surface layer. A process for making the polyimide aerogel comprises: (a) a mixture of dianhydride and diamine monomers forms a polyimide solution in a bipolarity basic solvent (DMAc or NMP); (b) the polyimide solution is cast into fleeces; (c) an acetic anhydride and a pyridine gel polyamide solution are used for chemical imidization reaction; (d) solvent in the gel is removed by supercritical or sub-supercritical drying technology so that a fiber/polyimide aerogel composite is formed. The entire process is time-consuming and costly, which undermines competitivity.

Disclosed in Chinese Pat. No. CN108203516A is A KIND OF METHOD FOR PREPARING CROSSLINKED POLYIMIDE AEROGE which adopts a sol-gel method. The method comprises steps of: (1) a polyamic acid solution is prepared by mixing aromatic diamine monomer with excessive aromatic dianhydride monomer an organic solvent; (2) a crosslinking agent is added in the polyamic acid solution at room temperature after mixing to induce gelling and aging to obtain a crosslinked polyamic acid wet gel; (3) the gel is dipped in a chemical imidization reagent at a low temperature, and heated for chemical imidization reaction to obtain a polyimide wet gel; (4) a solvent displacement is performed on the polyimide wet gel by supercritical drying so that a crosslinked polyimide aerogel is obtained. The entire process is time-consuming and costs a lot, which does not comply with cost-effectiveness and may be detrimental to competitivity.

Among traditional technologies for making multi-porous aerogel, a large amount of organic solvent and acid-base ions are required in sol-gel reaction. Surfactants or other additives are used in attempt to complete aerogel material. However, in subsequent processes, long term solvent displacement or deionized water are required for rinsing aerogel material to ensure stability of aerogel structure when drying in order to manufacture appropriate low-K dielectric products. In addition, aerogel material with excellent quality could be made efficiently by using supercritical or sub-supercritical CO2 drying technology to remove solvent from the gel.

Moreover, dielectric constant remains above 2.8 and dielectric loss above 0.003 when a polyimide aerogel or a fiber/polyimide aerogel with large amount of porosity is made by combining supercritical or sub-supercritical CO2 drying technology for removing solvent from polyimide gel. This results from a lot of dipole structure and hydrophilic groups contained in polyimide chemical structures. Therefore, the dielectric constant or dielectric loss do not decrease significantly after crosslinking-solidifying is completed.

SUMMARY

In "A LOW-K AEROGEL AND METHOD FOR MAKING THEREOF" as disclosed by the instant applicant in Taiwan Pat. Application No. 110106194, condensation rate of chunk-shaped aerogel is reduced by using rapid condensation technology to make the same. Besides, during the process, there is no requiring the aerogel to be immersed in solvent and performing organic solvent displacement, and therefore a rapid preparation of a complete aerogel structure can be achieved. This prior art aims to control aerogel structure by using rapid gelling technology, and the gel is rinsed in deionized water so that charged ions can be removed so as to minimize ion abundance in subsequent applications. Thus, steps of solvent displacement and supercritical drying are omitted in the entire process. Surprisingly, a multi-porous low-K film is obtained by aging for a couple to dozens of minutes. In the following process, the aerogel material is compounded with a polymer solution (polyimide, epoxy or polyphenylene ether) so that a multi-porous polymer/aerogel composite of high intensity is made. Nonetheless, in this prior art deionized water is required for rinsing charged ions from the aerogel structure, which squanders lots of time and produces massive waste water.

To improve current low-K aerogel production process and to achieve massive production of low-K aerogel composite with high purity (low impurity), the present invention provides a method for making an aerogel material featuring of low dielectric loss ($D_F$<0.003) in a simplified manner. Next, the aerogel material is compounded with a polymer solution comprising polyimide, epoxy, polyphenylene ether or so forth, so that a multi-porous polymer/aerogel composite is obtained. Physical properties of such a polymer/aerogel composite including intensity, dielectric constant ($D_K$) or dielectric loss ($D_F$) can be adjusted through changing content ratios of aerogels to various types of polymer solutions. Related products are suitable for applications such as 5G rapid transmit, electric autonomous automobile signal transmitting and materials required for lithium battery module security. Furthermore, drawbacks of processes in the prior art can be avoided, such as inhomogeneous low-K structure of semiconductor device, insignificant low dielectric constant, significant low dielectric loss, or difficulty of introducing supercritical drying technology to semiconductor manufacturing.

The present invention provides a low thermal conductivity and low-K dielectric aerogel material, wherein the aerogel material comprises a pure aerogel or a fiber/aerogel composite and a method for making thereof. In the first embodiment, the method comprises steps of:
(1) mix and hydrolysis step: a siloxane precursor is added to an ethanol water solution to form a mixed solution and then an acid catalyst is added to the mixed solution to perform a hydrolysis reaction, wherein the siloxane precursor comprises a hydrophobic siloxane compound, a siloxane compound or a combination thereof;
(2) dispersion and condensation step: a dispersing solution is added to the mixed solution, and then an emulsifier or a stirring equipment is used to disperse the siloxane precursor to form a homogeneous sol, and the dispersing solution comprises a base catalyst;

(3) molding step: the sol is injected to a mold so as to promote the sol to further condense into a solid-like aerogel wet-gel structure, and the mold comprises a molding mold or a molding mold comprising fibers; and (4) drying step: at atmospheric pressure, the solid-like aerogel wet-gel structure is dried at a drying temperature so as to obtain a low thermal conductivity and low-K dielectric aerogel material with an homogeneous structure, wherein the drying temperature ranges from 60 to 150° C.

In the aforementioned method, the drying step comprises:

(3.1) solvent vaporizing step: the solid-like aerogel structure is placed at an azeotropic vaporizing temperature so that ethanol water solution in the solid-like aerogel wet-gel structure accomplishes azeotropic vaporization rapidly, and then distilling-drying the ethanol water solution to obtain a half-dried aerogel structure, wherein the azeotropic vaporizing temperature ranges from 60 to 110° C.; and (3.2) Solvent bumping step: temperature of the half-dried aerogel structure is adjusted to a bumping temperature so that trace amount of solvent in the half-dried aerogel structure bumps rapidly with water molecules to produce a positive vapor pressure, and to the positive vapor pressure produces a large amount of micropores in the half-dried aerogel structure, wherein the bumping temperature ranges from 110 to 150° C.

In the present invention, hydrophobic organic solvents such as toluene or hexane are not involved for making the low thermal conductivity and low-K dielectric aerogel material. Sol-gel technology with extremely trace amount of acid ions or base ions is applied during the process, but auxiliary agents such as surfactants are not required, either. In particular, a high purity, low thermal conductivity and low-K dielectric aerogel material can be manufactured without multiple times of hydrophobic organic solvent displacement.

On the other hand, in order to increase applicability of rear-end products, intensity of the low thermal conductivity and low-K dielectric aerogel material structure requires further improvement. In some embodiments, at the molding step, the sol is injected to a molding substrate containing fiber glyphs, fiber paper, fiber blanket or fiber pad; on such a condition, aerogel molecule in the sol firstly attaches to fiber surface and clusters into a 3D aerogel network structure during condensation. Thereby, a solid-like aerogel/fiber molded body containing a large amount of fibers is formed, and a low thermal conductivity and low-K dielectric aerogel material film or pad is formed at the following drying step.

In addition, at (1) mix and hydrolysis step, when content ratio of the acid catalyst in the mixed solution is higher, the hydrolysis is faster. However, such property of containing a large amount of acid ions provides ionic conductivity in an electric field so that dielectric constant and dielectric loss of the aerogel structure is significantly increased. On the contrary, when content ratio of the catalyst in the mixed solution is lower, the hydrolysis is slowed down. Thus, in the present invention, hydrolysis rate of the trace amount of acid ions is enhanced through reducing content ratio of the acidic catalyst as temperature increases. Eventually, entire content ratio of the acid ions is critically minimized. In another aspect, the hydrophobic siloxane compound and the siloxane compound produce abundant alcoholic molecules during hydrolysis. In order to cut the amount of adding organic solvent (e.g. alkanes) or inorganic solvent (e.g. ammonia), the solvent is displaced by deionized water during hydrolysis. Besides minimizing the influence of organic solvent on aerogel dielectric property, hazard and risk of disposing organic solvent used in the process can be mitigated, and cost of the entire process to make aerogel material is also cut down.

Preferably, at (2) the dispersion and condensation step, as catalyzed by the basic catalyst solution, hydrolyzed siloxane molecules or hydrolyzed hydrophobic siloxane molecules in the hydrolyzed solution are rapidly stirred to form molecular drops sized of nano-scale to submicron-scale by an emulsifier or a homogenizer. The molecular drops comprise hydrolyzed siloxane molecules, hydrophobic siloxane molecules or a combination thereof.

Preferably, at (3) the molding step, the sol containing nano-scale to submicron-scale drop is injected into a molding mold to form a molded structure into a specific shape. For example, the shape can be a membrane, a sheet or a pad. In a couple of minutes, the hydrolyzed siloxane molecules and the hydrolyzed hydrophobic siloxane molecules in the nano-scale to submicron-scale molecular drops speed up gathering by repulsion of water, and a 3D siloxane network aerogel wet-gel structure is formed. At (3) the molding step, in the nano-scale to submicron-scale molecular drops, initial structure size of the nano-scale to submicron-scale molecular drops can be controlled between 5 to 10 nanometers. Then, the aerogel wet-gel molecules accumulate into a larger complex and crosslink each other into a 3D network structure so that a half-solidified aerogel wet-gel structure containing abundant alcohols-water solutions is stabilized and formed.

Preferably, to increase structural intensity of the low thermal conductivity and low-K dielectric aerogel material, at (3) the molding step, the sol containing nano-scale to submicron-scale hydrolyzed siloxane and hydrophobic siloxane is injected to a mold containing a large amount of fibers. the fiber comprises fiber glyphs, fiber paper, fiber blanket or fiber pad. On such a condition, the nano-scale to submicron-scale hydrolyzed siloxane and hydrophobic siloxane firstly attaches to fiber surface, and forms 3D siloxane network by water repulsion. A stabilized solid-like aerogel/fiber molding body containing a large amount of fiber is formed thereby.

Preferably, at (4) drying step, after the solid-like aerogel wet gel structure is stabilized, alcoholic solution inside the aerogel wet-gel structure is vaporized at a drying temperature at atmospheric pressure. In some embodiments, the (4) drying step further comprises (4-1) a solvent vaporizing step and (4-2) a solvent bumping step; at (4-1) the solvent vaporizing step, the solid-like aerogel structure is placed and dried at an azeotropic vaporizing temperature so that ethanol water solution in the solid-like aerogel wet-gel structure is vaporized rapidly; at (4-2) the solvent bumping step, temperature of the half-dried aerogel structure is adjusted to a bumping temperature so that trace amount of ethanol water solution in the half-dried aerogel structure bumps rapidly to produce a positive vapor pressure, and the positive vapor pressure prevents aerogel structure from shrinking or crushing during drying process.

Preferably, to cope with drawbacks of currently-known polyimide aerogel manufacturing process including time consuming, cost ineffectiveness and use of supercritical or sub-supercritical CO2 drying technology, a simplified process to make a pure aerogel or a fiber/aerogel composite is disclosed in the present invention. The pure aerogel or the fiber/aerogel composite is further seeped by polymer solutions (e.g. polyimide) via immersion or spraying technique, and instantly followed up by processes including solvent drying and crosslinking-solidifying so that a polymer/aerogel composite or a polymer/fiber/aerogel composite is prepared. The entire process involves simple techniques, and cost is cut down while supercritical or sub-supercritical $CO_2$ drying technique is not required.

In the second embodiment of the present invention, the method further comprises:

(5) polymer solution impregnating step: a polymer solution is prepared and the polymer solution is injected into the low thermal conductivity and low-K dielectric aerogel material so that polymeric chains penetrate homogeneously into interior of the low thermal conductivity and low-K dielectric aerogel material to form a polymer solution-containing pure aerogel composite or a polymer solution-containing fiber/aerogel composite, wherein the polymer solution comprises a polymer and a mixing solvent, and the polymer comprises a thermosetting polymer, a thermoplastic polymer, a liquid crystalline polymer or a combination thereof; and (6) solvent drying step: polymer solution-containing pure aerogel composite or the polymer solution-containing fiber/aerogel composite is placed at a solvent drying temperature so as to vaporize solvent of the polymer solution, so that the polymer coats a network structure surface inside the pure aerogel or a fiber surface inside the pure aerogel or the fiber/aerogel composite to form a polymer/aerogel composite or a polymer/fiber/aerogel composite, wherein the solvent drying temperature ranges from 60 to 115° C.; when the polymer is a thermosetting polymer, the aerogel material is instantly molded at a crosslinking-solidifying temperature right after solvent drying. A thermosetting polymer/aerogel composite, a thermosetting polymer/fiber/aerogel composite, a thermoplastic polymer/aerogel composite or thermoplastic polymer/fiber/aerogel composite featuring of high intensity, low thermal conductivity and low-K is thereby obtained by the process as mentioned above.

Preferably, the thermosetting polymer comprises epoxy resin, polyimide, polyetherimide, polyphenylene ether, polyphenylene sulfide, polyether ketone, phenolic plastic ester, polymelamine-formaldehyde plastic ester or a combination thereof.

Preferably, the thermoplastic polymer comprises polyethylene, polypropylene, PTFE, polycarbonate, polyamide, polyamide, polyester or a combination thereof.

At the aforementioned (5) polymer solution impregnating step, when the low thermal conductivity and low-K dielectric aerogel material forms with appropriate intensity, the polymer solution is injected into the aerogel material so that polymeric chains seep with the solvent into the pores inside the aerogel material homogeneously. A polymer solution-containing pure aerogel composite or a polymer solution-containing fiber/aerogel composite is formed thereby. At (6) the solvent drying step, the polymer solution in the pure aerogel or the fiber/aerogel composite would go through at a liquid-solid phase separation and forms a solvent-rich phase and a polymer-rich phase. During the phase separation, solvent at solvent-rich phase will gradually vaporize. In another aspect, polymeric chains at polymer-rich phase would be coated onto aerogel framework or fiber surface in the first place, and then form a polymer membrane layer on the aerogel framework or the fiber surface.

Preferably, based on entire volume of the polymer solution, the polymer concentration in the polymer solution ranges from 0.01 wt % to 80.0 wt %; more preferably, the polymer concentration in the polymer solution ranges from 5.0 wt % to 30.0 wt %; wherein the lower the polymer concentration is, the more efficiently the polymer seeps into pores inside the aerogel structure, and the low thermal conductivity and low-K dielectric polymer/aerogel composite or polymer/fiber/aerogel composite contains higher porosity. Therefore, low thermal conductivity and low-K dielectric properties of the aerogel material are more superior. On the contrary, the higher the polymer concentration is, the higher content ratio the polymer coating inside the silicon-based aerogel, and the better the intensity of end-product. Therefore, adjusting concentration of polymer solution allows controlling dielectric property and intensity of the low thermal conductivity and low-K polymer/aerogel composite or polymer/fiber/aerogel composite.

At the aforementioned (6) solvent drying step, when the polymer is a thermoplastic polymer, a thermoplastic polymer/aerogel composite or a polymer/fiber/aerogel composite featuring of high intensity, high tensile strength, light-weighted and low-K dielectric property can be formed after solvent drying is accomplished. In particular, the thermoplastic polymer comprises polyethylene (PE), polypropylene (PP), polycarbonate (PC), polyamide (PA), polyesteramide (PEA), polyethylene terephthalate (PET), polytetrafluoroethylene (PTFE) or a combination thereof. In another aspect, when the polymer is a thermosetting polymer, a thermosetting polymer/aerogel composite or a thermosetting polymer/fiber/aerogel composite featuring of high intensity, high tensile strength, light-weighted and low-K dielectric property can be formed after (6) solvent drying step followed by (7) crosslinking-solidifying step. In particular, the thermosetting polymer comprises epoxy, polyimide (PI), polyetherimine (PEI), polyphenylene oxide (PPO), polyphenylene sulfide (PPS), polyetherketone (PEK), polyetheretherketone (PEEK) or a combination thereof.

At the aforementioned (6) solvent drying step, the organic solvent inside the low thermal conductivity and low-K dielectric aerogel material containing polymer is vaporized such that the low thermal conductivity and low-K dielectric aerogel material containing polymer is dried gradually. The solvent drying temperature depends on a boiling point of a mixing solvent in the polymer solution. In some embodiments, the mixing solvent is ethanol, wherein the solvent drying temperature ranges from 60° C. to 75° C. In some other embodiments, the mixing solvent is butanone, wherein the solvent drying temperature ranges from 80° C. to 90° C. As a result, without abundant bubbles which result from too high drying temperature, the low thermal conductivity and low-K dielectric aerogel material containing polymer shows less tendency to deform.

Preferably, at the aforementioned (6) solvent drying step, when the polymer is a thermosetting polymer, the method further comprises a (7) crosslinking-solidifying step after the solvent drying step. At a specific temperature for the thermosetting polymer to be crosslinked or solidified, a crosslinking reaction proceeds between the thermosetting polymer chains or between the thermosetting polymer chains and the aerogel for solidification. For instance, when the thermosetting polymer is epoxy, the crosslinking-solidifying temperature is 175° C. to 200° C., and 185° C. to 190° C. is preferred. On the other hand, when the thermosetting polymer is polyimide, the crosslinking-solidifying temperature is 120° C. to 325° C.; preferably, the crosslinking-solidifying temperature is 120° C., 200° C., or 260° C. to 325° C.; in some embodiments, the crosslinking-solidifying temperature is 320° C. to 325° C. At the (7) crosslinking-solidifying step, at a specific crosslinking-solidifying temperature, polymer chains coating on aerogel network crosslink each other so that a 3D network structure is formed between polymer chains or between polymer and aerogel. Consequently, a polymer/aerogel composite or a polymer/fiber/aerogel composite featuring of high heat resistance, high tensile strength, light-weighted and low-K dielectric property can be formed.

Preferably, the siloxane compound comprises tetramethoxysilane (TMOS), tetraethoxysilane (TEOS) or a combination thereof; the hydrophobic siloxane compound comprises methyltrimethoxysilane (MTMS), methyltriethoxysilane (MTES) or a combination thereof, wherein, based on the entire mixed solution, a content molar ratio of the siloxane compound to the hydrophobic siloxane compound ranges from 0:100 to 40:60. Adding the hydrophobic siloxane compound aims to attenuate the risk of aerogel structural cracking during drying process and to minimize thermal conductivity and dielectric constant in order to reduce dielectric loss.

Preferably, the ethanol water solution comprises (1) ethanol, and (2) deionized water, distilled water or secondary distilled water.

Preferably, the fiber comprises glass fiber, ceramic fiber, rock wool fiber, polypropylene fiber, nylon fiber or polyester fiber; wherein the fiber is multi-porous glyph, multi-porous paper, multi-porous blanket, multi-porous rope, multi-porous plate or a combination thereof.

Preferably, he polymer concentration in the polymer solution ranges from 0.01 wt % to 80.0 wt %; more preferably, the polymer concentration in the polymer solution ranges from 5.0 wt % to 30.0 wt %.

Preferably, seeping of the polymer solution comprising suction, impregnation, spray, injection, perfusion or a combination thereof.

Preferably, the low thermal conductivity and low-K dielectric aerogel material is a multi-porous structure with porosity ranging from 40.0% to 95.0%, density ranging from 0.180 g/cm$^3$ to 0.600 g/cm$^3$; thermal conduction k of pure aerogel thin film or plate ranges from 0.013 W/mk to 0.018 W/mk, dielectric constant ranges from 1.20 to 1.87 and dielectric loss ranges from 0.0026 to 0.0078.

The method provided in the present invention realizes rapid production of a polymer/aerogel composite or a polymer/fiber/aerogel composite featuring of high intensity and low-K dielectric loss. At first, a modified sol-gel process is performed on a condition using small volume of organic solvent and low concentration of acid-base ions, and rapid condensation-dispersion is carried out with an emulsifier or a homogenizer to prepare a pure aerogel or a fiber/aerogel composite. Moreover, the pure aerogel or the fiber/aerogel composite is compounded with a polymer solution by impregnation through suction, injection, immersion or other applicable techniques. Solvent drying and crosslinking-solidifying are instantly performed so as to obtain the polymer/aerogel composite or the polymer/fiber/aerogel composite featuring of high intensity, high tensile strength, low thermal conductivity and low-K dielectric property, wherein the polymer comprises a thermosetting polymer or a thermoplastic polymer.

The beneficial effects brought about by the method in the present invention are described as following:

1. The method disclosed in the present invention is modified from traditional sol-gel process in order to make low thermal conductivity and low-K dielectric aerogel material. During the sol-gel process, solvents other than alcohols, surfactants or binding agents are not involved. Thus, contents of electric conductive impurity inside the prepared aerogel composites are critically reduced. Besides, time-consuming solvent displacement or rinsing with deionized water is avoided during the process. The entire process is simplified, much safer and more economically advantageous. Batch production can be accomplished within 12 to 48 hours. Continuous production of aerogel composites or polymer/aerogel composite s in a form of thin film or thin pad sized of dozens to hundreds of microns can be achieved, and productivity can be enhanced thereby.

2. The method disclosed in the present invention controls porosity, pore size and compactness of the low thermal conductivity and low-K dielectric aerogel material through adjusting factors such as ratio of siloxane compound to hydrophobic siloxane, contents of dispersing solvent, rate of stirring, and content ratio of acid catalyst and base catalyst.

3. The method disclosed in the present invention involves no solvents other than ethanol, such as alkanes, aromatics or ammonia. Surfactants and organic/inorganic binding agents are not involved either. Meanwhile, concentrations of acid catalyst and base catalyst are maintained at an extremely low level. Thermal conductivity and low-K dielectric property of the aerogel material are both controlled so that applicability of aerogel material can be broadened.

4. The method disclosed in the present invention further includes immersing the pure aerogel or the fiber/aerogel composite in a polymer solution so that a polymer/aerogel composite or a polymer/fiber/aerogel composite can be prepared. Techniques such as immersing, spraying, suction or impregnation are applied for preparation of aerogel composite of high intensity, high porosity, low thermal conductivity and low-K dielectric property.

5. In the method disclosed in the present invention, at the polymer solution impregnating step, polymer chains seep into interior pores inside the silicon-based aerogel composites in a homogeneous manner. Aerogel structure and polymer compound together to form a low thermal conductivity and low-K dielectric polymer/aerogel composite or a polymer/fiber/aerogel composite; wherein properties such as intensity, heat resistance, binding strength with other materials, thermal conductivity constant and low-K dielectric property are able to be manipulated through adjusting chemical structure or concentration of the polymer; wherein, products made by the method in the present invention possess properties such that porosity ranges from 40.0 to 95%, density ranges from 0.180 to 0.600 g/cm$^3$, thermal conduction k ranges from 0.013 to 0.018 W/mk, dielectric constant ranges from 1.20 to 1.87 and dielectric loss ranges from 0.0026 to 0.0078.

BRIEF DESCRIPTION OF THE DRAWINGS

The present invention can be more fully understood by reading the following detailed description of the embodiment, with reference made to the accompanying drawings as following.

DETAILED DESCRIPTION

Figure 1:
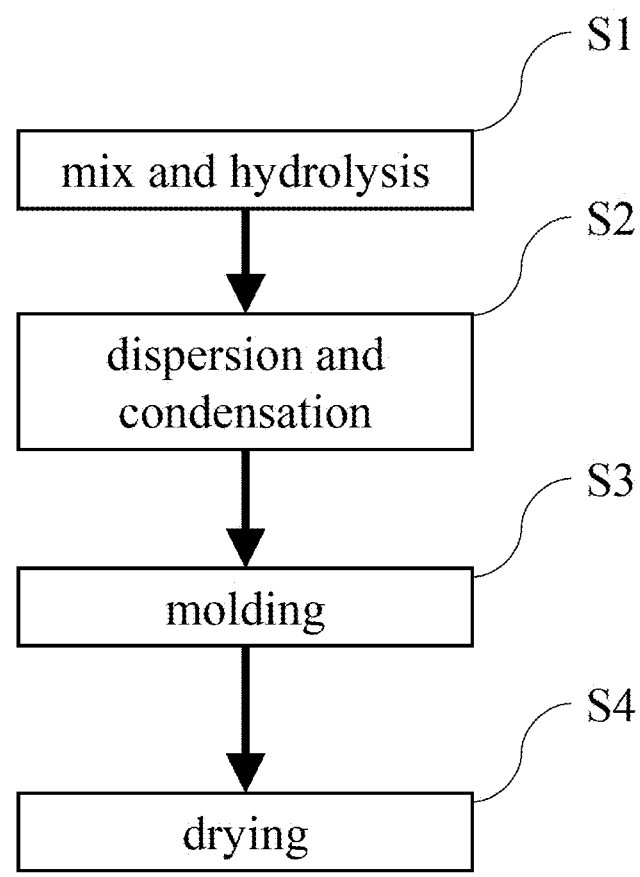
FIG. 1 is a flowchart illustrating a workflow for preparing a low thermal conductivity and low-K dielectric aerogel material in the first embodiment of the present invention.

Please refer to FIG. 1 illustrating a method for making a low thermal conductivity and low-K aerogel material in a first embodiment of the present invention, wherein the aerogel material comprises a pure aerogel or a fiber/aerogel composite, and the method comprises steps of: mix and hydrolysis step (S1), dispersion and condensation step (S2), molding step (S3) and drying step (S4), wherein:

Mix and hydrolysis step (S1): adding a siloxane precursor to an ethanol water solution to form a mixed solution and then an acid catalyst is added to the mixed solution to perform a hydrolysis reaction, wherein the siloxane precursor comprises a hydrophobic siloxane compound, a siloxane compound or a combination thereof, a; in some embodiments, the siloxane compound comprises tetramethoxysilane (TMOS), tetraethoxysilane (TEOS) or the combination thereof; the hydrophobic siloxane compound comprises methyltrimethoxysilane (MTMS), methyltriethoxysilane (MTES) or the combination thereof. The purpose of adding the hydrophobic siloxane compound is to attenuate the risk of aerogel structural cracking during drying process, and adding siloxane compound aims to regulate microstructures inside aerogel and to increase porosity. In some embodiments, based on the mixed solution, a content molar ratio of the siloxane compound or the hydrophobic siloxane compound ranges from 0.5 mol % to 40.0 mol %, and a molar ratio of the ethanol water solution ranges from 99.5 mol % to 60.0 mol %.

In some embodiments, the molar ratio of the siloxane compound to the hydrophobic siloxane compound ranges from 0:100 to 40:60; in preferred embodiments, the molar ratio of the siloxane compound to the hydrophobic siloxane compound is 5:95; in the ethanol water solution, a molar ratio of ethanol to water ranges from 0:100 to 50:50; in preferred embodiments, a molar ratio of ethanol to water is 15:85.

When the siloxane compound or the hydrophobic siloxane compound thoroughly mixes with the ethanol water solution containing trace amount of acidic catalyst, hydrolysis is performed simultaneously; wherein the ethanol water solution containing acidic catalyst comprises (1) ethanol, and (2) deionized water, treated water, secondary treated water or a combination of one or more, and a molar ratio of the siloxane compound or the hydrophobic siloxane compound to the acidic catalyst is 1:0.01 to 1:0.00005. When the molar ratio of the siloxane compound or the hydrophobic siloxane compound to the acidic catalyst is higher, the hydrolysis rate is higher. In other words, while content ratio of the acidic catalyst is higher, the entire aerogel structure contains more ions, which results in larger dielectric loss; in preferred embodiments, the molar ratio of the siloxane compound or the hydrophobic siloxane compound to the acidic catalyst is 1:0.00014.

Dispersion and condensation step (S2): a dispersing solution is added to the mixed solution and then an emulsifier or a stirring equipment is used to disperse the siloxane precursor to form a homogeneous sol, and the dispersing solution comprises a base catalyst. To be more specific, during condensation, reaction rate of condensation can be adjusted through controlling condensation temperature, water contents as well as stirring rate so as to regulate aerogel microstructure in the sol. A volume ratio of the dispersing solution to the ethanol water solution is 75:25 to 30:70. In preferred embodiments, the volume ratio of the dispersing solution to the ethanol water solution is 50:50.

During condensation, rising of temperature critically shortens condensation reaction time. In brief, gelling time of the aerogel at dispersion and condensation step (S2) can be shortened effectively. When an equivalent ratio of the basic catalyst to the acidic catalyst is 1.0:1.0, the condensation temperature ranges from 20° C. to 55° C. and the condensation time ranges from 20 to 250 minutes. In preferred embodiments, when the condensation temperature is 25° C., the condensation time is 220 minutes; when the condensation temperature is 50° C., the condensation time is 15 minutes.

In other embodiments, increasing of the basic catalyst contents also critically shortens condensation reaction time, wherein the equivalent ratio of 1.0M basic catalyst to 1.0M acidic catalyst ranges from 0.8:1.0 to 2.0:1.0, and condensation reaction time is 360 minutes to 3 minutes. In one or more embodiments, the equivalent ratio is 0.8:1.0 and the condensation reaction time is 360 minutes. In preferred embodiments, the equivalent ratio is 1.6:1.0 and the condensation reaction time is 10 minutes. In particular, when the equivalent ratio is lower than 1.0:1.0, the condensation reaction time increases gradually, and dielectric loss of the prepared aerogel is reduced significantly. When the equivalent ratio is larger than 1.0:1.0, the condensation reaction time decreases gradually, and dielectric loss of the prepared aerogel rises significantly due to increased ion contents. In one preferred embodiment, the equivalent ratio is 1.2:1.0.

Molding step (S3): the sol is injected to a mold so as to promote the sol to further condense into a solid-like aerogel wet-gel structure, and the mold comprises a molding mold or a molding mold comprising fibers. At the molding step, homogeneously dispersed siloxane molecules and hydrophobic siloxane molecules forms a 3D siloxane network into an aerogel molecular cluster under water repulsion. The initial structural size of siloxane aerogel molecules can be controlled between 5 to 10 nanometers. The initial structure further clusters to an aerogel wet-gel molecule sized of 50 to 100 nanometers. The aerogel wet-gel molecule further clusters into a larger cluster and interconnects with each other to form a 3D network structure, and a half-solidified aerogel wet gel structure containing abundant alcohols-water solutions is stabilized and formed.

In some other embodiments, the sol is injected into a mold containing a large amount of fibers. The fibers comprises inorganic fibers or organic fibers, wherein the fiber is glyph-shaped, paper-shaped, blanket-shaped, pad-shaped or a combination thereof. Specifically, siloxane aerogel molecule attaches to fiber surface and condense upon the fiber surface. The siloxane aerogel molecule clusters into aerogel wet-gel molecules sized of 50 to 100 nanometers. The aerogel wet-gel molecule further clusters into a larger cluster and interconnects with each other to form a 3D network structure, and a half-solidified aerogel wet gel structure containing abundant alcohols-water solutions is stabilized and formed. At the molding step, the sol can be compounded with the fibers by immersion, suction, spraying, pouring or vacuum suction.

In some embodiments, the fiber comprises glass fiber, ceramic fiber, rock wool fiber, polypropylene fiber, nylon fiber or polyester fiber; wherein the fiber is multi-porous glyph, multi-porous paper, multi-porous blanket, multi-porous rope, multi-porous plate or a combination thereof.

Drying step (S4): at atmospheric pressure, the solid-like aerogel wet-gel structure is dried at a drying temperature so as to obtain a low thermal conductivity and low-K dielectric aerogel material with an homogeneous structure; preferably, the drying temperature ranges from 60 to 150° C.

Preferably, the drying step comprises solvent vaporizing step (S4-1) and solvent bumping step (S4-2).

Solvent vaporizing step (S4-1): the solid-like aerogel structure is placed at an azeotropic vaporizing temperature so that ethanol water solution in the solid-like aerogel wet-gel structure accomplishes azeotropic vaporization rapidly and distilling-dries the ethanol water solution; preferably, the azeotropic vaporizing temperature ranges from 60 to 110° C.

Solvent bumping step (S4-2): temperature of the half-dried aerogel structure is adjusted to a bumping temperature so that trace amount of solvent in the half-dried aerogel structure bumps rapidly with water molecules to produce a positive vapor pressure, and drying and shrinking of the aerogel structure is inhibited, and a large amount of nano-scale to submicron-scale micropores is produced in the aerogel structure, wherein the bumping temperature ranges from 110 to 150° C. Particularly, at the bumping temperature, trace amount of alcohol molecules and water molecules inside the aerogel structure approach to bumping and create a positive pressure. The positive pressure further prevent the aerogel structure from shrinking or crushing during drying process. Meanwhile, the positive pressure drives the aerogel network structure to swell and produce porosity. Therefore, the pure aerogel or the fiber/aerogel composite of low density and high porosity can be made by the method provided in the present invention, wherein thermal conductivity of the pure aerogel composite is 0.013 W/mk to 0.018 W/mk, and thermal conductivity of the aerogel/fiber composite is 0.022 W/mk to 0.032 W/mk.

In addition, solvents other than ethanol, such as alkanes, aromatics or ammonia, are not introduced to the process. Surfactants and organic/inorganic binding agents are not introduced either. Therefore, the drying process is safer and aerogel product with high purity can be made. The aerogel material does not contain impurity and features of low thermal conductivity, low dielectric constant and low dielectric loss.

Figure 2:
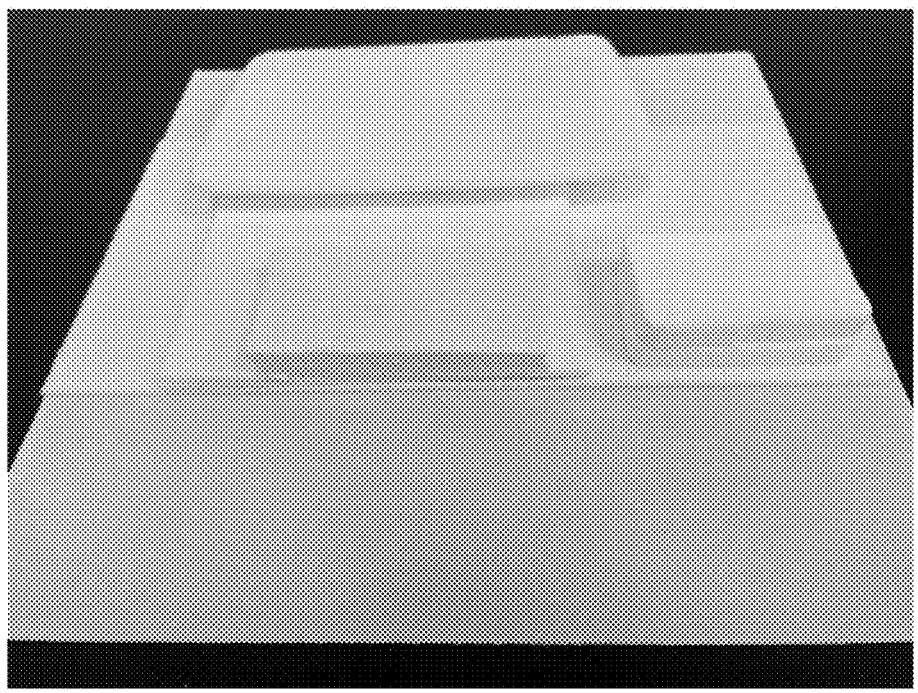
FIG. 2 is a photo demonstrating appearances of the low thermal conductivity and low-K dielectric aerogel material.

Please refer to FIG. 2. Shown in FIG. 2 is a photo of appearances of the low thermal conductivity and low-K dielectric aerogel material. The appearances are white boards or thin pads.

Figure 3:
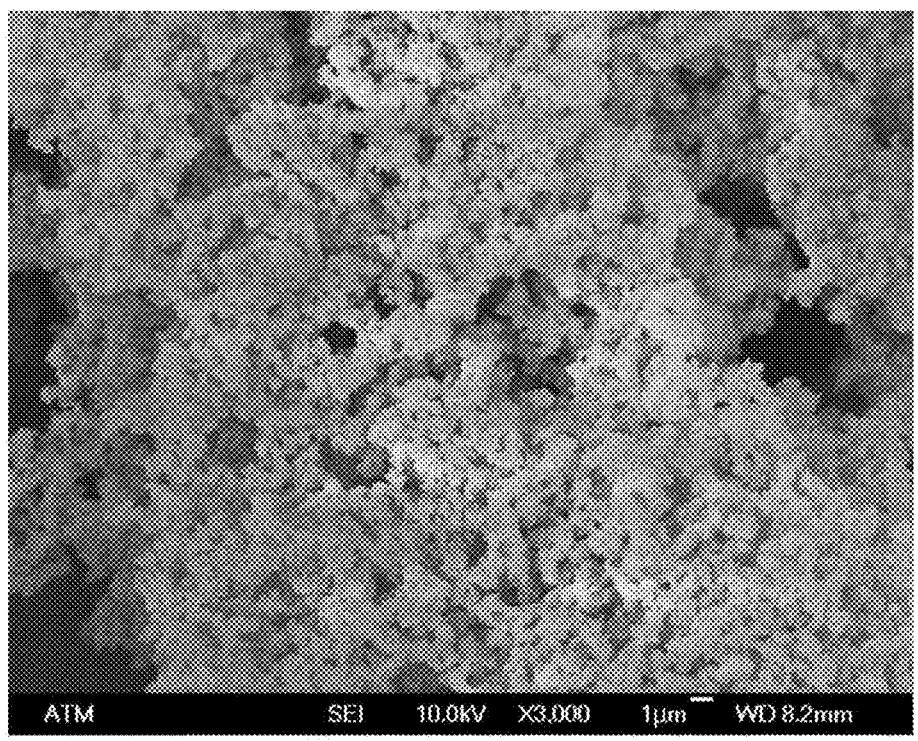
FIG. 3 is a 3000× scanning electron microscopy (SEM) photo showing cross section of the pure aerogel pad in the first embodiment.

Please refer to FIG. 3 which is a 3000× scanning electron microscopy (SEM) photo showing cross section of a pure aerogel pad. Under electron microscopy, the microstructure demonstrates a 3D network cluster of spheric aerogel of size ranging from submicron to micron. Moreover, there are tandem structures in addition to aerogel cluster inside the low thermal conductivity and low-K aerogel material. The tandem structures connect in a serial manner and form a porous structure, which endows the aerogel material low thermal conductivity and low-K properties.

Figure 4:
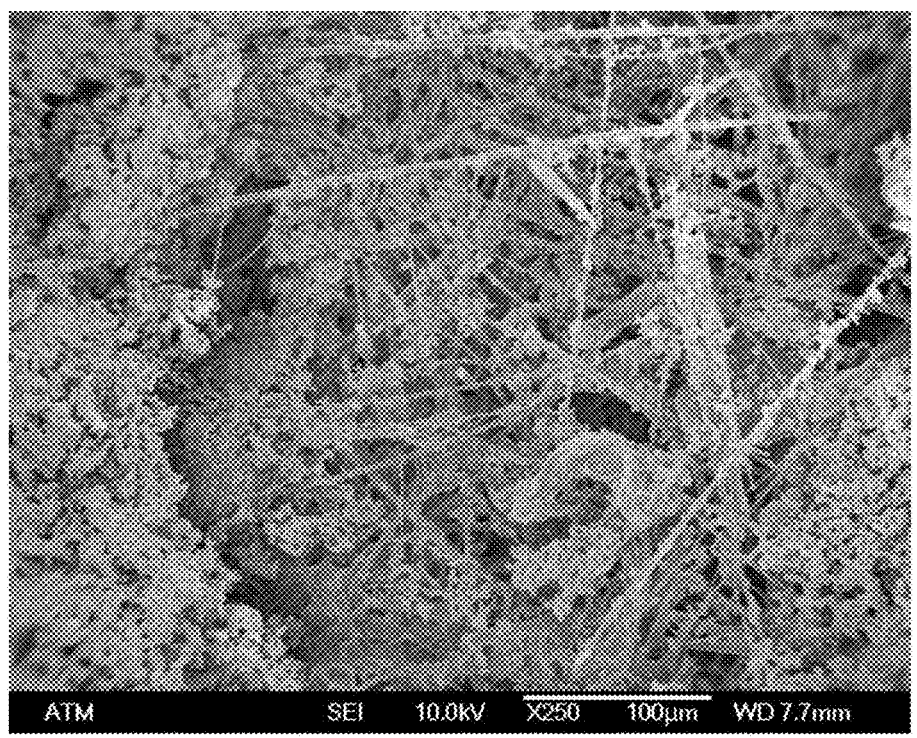
FIG. 4 is a 250×SEM photo showing cross section of the fiber/aerogel composite in the first embodiment.

Please refer to FIG. 4 which is a 250× scanning electron microscopy (SEM) photo showing cross section of a fiber/aerogel composite. As shown in FIG. 4, the fiber/aerogel composite is a 3D aerogel network structure formed by clustering of a large amount sub-micron aerogel molecules attaching to fiber surface. There is a large amount of porosity inside entire clustering structure, which provides low thermal conductivity and low-K dielectric property, while fibers enhance intensity of the fiber/aerogel composite.

Figure 5:
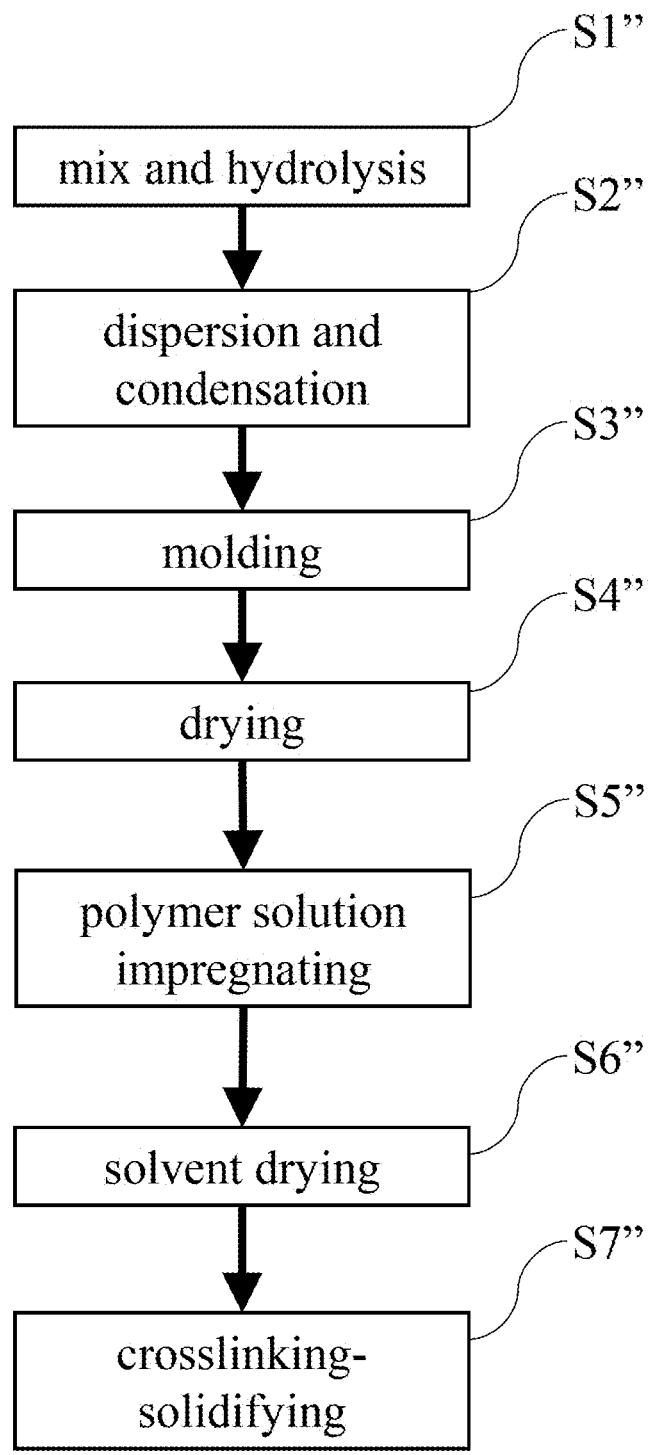
FIG. 5 is a flowchart illustrating a workflow of the second embodiment.

Please refer to FIG. 5. A workflow of the second embodiment in the present invention is illustrated in FIG. 5. In the second embodiment, a large amount of polymer solution is used for immersing or injecting into the aforementioned low thermal conductivity and low-K dielectric aerogel material so that a polymer/aerogel composite or a polymer/fiber/aerogel composite featuring of high intensity, low conductivity and low-K dielectric property is prepared. In the second embodiment, the method further comprises steps of: mix and hydrolysis step (S1"), dispersion and condensation step (S2"), molding step (S3"), drying step (S4"), polymer solution impregnating step (S5"), solvent drying step (S6") and crosslinking-solidifying step (S7"), wherein:

Mix and hydrolysis step (S1"): a siloxane precursor is added to an ethanol water solution to form a mixed solution and then an acid catalyst is added to the mixed solution to perform a hydrolysis reaction, wherein the siloxane precursor comprises a hydrophobic siloxane compound, a siloxane compound or a combination thereof; wherein the siloxane compound comprises tetramethoxysilane (TMOS), tetraethoxysilane (TEOS) or the combination thereof; the hydrophobic siloxane compound comprises methyltrimethoxysilane (MTMS), methyltriethoxysilane (MTES) or the combination thereof. Based on the entire mixed solution, a content molar percentage of the siloxane compound or the hydrophobic siloxane compound is 0.5 mol % to 40.0 mol %, and the content molar percentage of the ethanol water solution is 99.5 mol % to 60.0 mol %.

In some embodiments, a molar ratio of the siloxane compound to the hydrophobic siloxane compound is 0:100 to 40:60; in one preferred embodiment, the molar ratio of the siloxane compound to the hydrophobic siloxane compound is 5:95; in the ethanol water solution, a molar ratio of ethanol to water is 0.01:100 to 50:50; in one preferred embodiment, the molar ratio of ethanol to water is 15:85.

When the siloxane compound or the hydrophobic siloxane compound thoroughly mixes with the ethanol water solution containing trace amount of acidic catalyst, hydrolysis is performed simultaneously; wherein the ethanol water solution containing acidic catalyst comprises (1) ethanol, and (2) deionized water, treated water, secondary treated water or a combination of one or more, and a molar ratio of the siloxane compound or the hydrophobic siloxane compound to the acidic catalyst is 1:0.01 to 1:0.00005. When the molar ratio of the siloxane compound or the hydrophobic siloxane compound to the acidic catalyst is higher, the hydrolysis rate is higher. In other words, while content ratio of the acidic catalyst is higher, the entire aerogel structure contains more ions, which results in higher dielectric loss; in preferred embodiments, the molar ratio of the siloxane compound or the hydrophobic siloxane compound to the acidic catalyst is 1:0.00014.

Dispersion and condensation step (S2"): a dispersing solution is added to the mixed solution and then an emulsifier or a stirring equipment is used to disperse the siloxane precursor to form a homogeneous sol, and the dispersing solution comprises a base catalyst. A volume ratio of the dispersing solution to the ethanol water solution is 75:25 to 30:70. In preferred embodiments, the volume ratio of the dispersing solution to the ethanol water solution is 50:50.

During condensation, rising of temperature critically shortens condensation reaction time. In brief, gelling time of the aerogel at dispersion and condensation step (S2") can be reduced effectively. When an equivalent ratio of the basic catalyst to the acidic catalyst is 1.0:1.0, the condensation temperature ranges from 20° C. to 55° C. and the condensation time ranges 20 to 250 minutes. In preferred embodiments, when the condensation temperature is 25° C., the condensation time is 220 minutes; when the condensation temperature is 50° C., the condensation time is 25 minutes.

In other embodiments, increasing of the basic catalyst contents also critically shorten condensation reaction time, wherein the equivalent ratio of 1.0M basic catalyst to 1.0M acidic catalyst is 0.8:1.0 to 2.0:1.0, and condensation reaction time is 3 minutes to 360 minutes. In one or more embodiments, the equivalent ratio is 0.8:1.0 and the condensation reaction time is 360 minutes. In preferred embodiments, the equivalent ratio is 1.6:1.0 and the condensation reaction time is 10 minutes. In one preferred embodiment, the equivalent ratio is 1.2:1.0.

Molding step (S3"): the sol is injected to a mold so as to promote the sol to further condense into a solid-like aerogel wet-gel structure, and the mold comprises a molding mold or a molding mold comprising fibers. At the molding step, homogeneously dispersed siloxane molecules and hydrophobic siloxane molecules forms a 3D siloxane network into an aerogel molecular cluster under water repulsion. The initial structural size of siloxane aerogel molecules can be controlled between 5 to 10 nanometers. The initial structure further clusters to an aerogel wet-gel molecule sized of 50 to 100 nanometers. The aerogel wet-gel molecule further clusters into a larger cluster and interconnects with each other to form a 3D network structure, and a half-solidified aerogel wet gel structure containing abundant alcohols-water solutions is stabilized and formed.

In some other embodiments, the sol is injected into a mold containing abundant fibers. The fibers comprises inorganic fibers or organic fibers, wherein the fiber is glyph-shaped, paper-shaped, blanket-shaped, pad-shaped or a combination thereof. Specifically, siloxane aerogel molecules attach to fiber surface and condense upon the fiber surface. The siloxane aerogel molecules cluster into aerogel wet-gel molecular drops sized of 50 to 100 nanometers. The aerogel wet-gel molecular drops further clusters into a larger cluster and interconnects with each other to form a 3D network structure, and a half-solidified aerogel wet-gel structure containing abundant alcohols-water solutions is stabilized and formed. At the molding step, the sol can be compounded with the fibers via immersion, suction, spraying, pouring or vacuum suction.

In one or various embodiments, the fiber comprises glass fiber, ceramic fiber, rock wool fiber, polypropylene fiber, nylon fiber or polyester fiber; wherein the fiber is multi-porous glyph, multi-porous paper, multi-porous blanket, multi-porous rope, multi-porous plate or a combination thereof.

Drying step (S4"): at atmospheric pressure, the solid-like aerogel wet-gel structure is dried at a drying temperature so as to obtain a low thermal conductivity and low-K dielectric aerogel material with an homogeneous structure; preferably, the drying temperature ranges from 60 to 150° C.

Preferably, the drying step comprises solvent vaporizing step (S4-1") and solvent bumping step (S4-2"), wherein:

Solvent vaporizing step (S4-1"): the solid-like aerogel structure is placed at an azeotropic vaporizing temperature so that ethanol water solution in the solid-like aerogel wet-gel structure accomplishes azeotropic vaporization rapidly and then the ethanol water solution is distilled and dried; preferably, the azeotropic vaporizing temperature ranges from 60 to 110° C.

Solvent bumping step (S4-2"): temperature of the half-dried aerogel structure is adjusted to a bumping temperature so that trace amount of solvent in the half-dried aerogel structure bumps rapidly with water molecules to produce a positive vapor pressure, and the positive vapor pressure produces a large amount of micropores in the half-dried aerogel structure, wherein the bumping temperature ranges from 110 to 150° C. Particularly, at the bumping temperature, trace amount of alcohol molecules and water molecules inside the aerogel structure approach to bumping and create a positive pressure. The positive pressure further prevent the aerogel structure from shrinking or crushing during drying process. Meanwhile, the positive pressure drives the aerogel network structure to swell and produce porosity. Therefore, aerogel material featuring of low density and high porosity can be made by the method provided in the present invention, wherein thermal conductivity of the pure aerogel thin film or the pure aerogel thin film pad ranges from 0.013 W/mk to 0.018 W/mk, and thermal conductivity of the aerogel/fiber thin film or the pure aerogel thin film pad ranges from 0.022 W/mk to 0.032 W/mk.

Polymer solution impregnating step (S5"): a polymer solution is prepared and the polymer solution is injected into the low thermal conductivity and low-K dielectric aerogel material so that polymeric chain penetrates homogeneously into interior of the low thermal conductivity and low-K dielectric aerogel material to form a polymer solution-containing pure aerogel composite or a polymer solution-containing fiber/aerogel composite, wherein the polymer solution comprises a polymer and a mixing solvent, and the polymer comprises a thermosetting polymer, a thermoplastic polymer, a liquid crystalline polymer or a combination thereof.

Drying step (S6"): the polymer solution-containing pure aerogel composite or the polymer solution-containing fiber/aerogel composite is placed at a temperature higher than boiling point of the mixing solvent so that the mixing solvent vaporizes and attachment of the polymer to surfaces of aerogel network or the fibers is promoted, wherein the drying temperature ranges from 60 to 115° C.

In particular, when the polymer solution is a thermoplastic polymer, the polymer/aerogel composite or the polymer/fiber/aerogel composite is obtained by solidification after the solvent drying step. When the polymer solution is a thermosetting polymer, the polymer/aerogel composite or the polymer/fiber/aerogel composite is molded at a crosslinking or solidification temperature after the solvent drying step. By technologies as mentioned above, the aerogel material featuring of high intensity, low thermal conductivity and low-K dielectric property is obtained, wherein the aerogel material is a thermosetting polymer/aerogel composite, a thermosetting polymer/fiber/aerogel composite, a thermoplastic polymer/aerogel composite or a thermoplastic polymer/fiber/aerogel composite.

Preferably, at the polymer solution impregnating step (S5"), when the pure aerogel or the fiber/aerogel composite is dried and molded, the pure aerogel or the fiber/aerogel composite is instantly immersed in the polymer solution or the polymer solution is sprayed onto the pure aerogel or the fiber/aerogel composite so that the polymer solution homogeneously seeps into interior pores of the pure aerogel or the fiber/aerogel composite and a polymer solution-containing pure aerogel composite is formed. The polymer solution-containing pure aerogel composite comprises a polymer solution-containing pure aerogel composite or a polymer solution-containing fiber/aerogel composite.

Preferably, based on entire volume of the polymer solution, the polymer concentration in the polymer solution ranges from 0.01 wt % to 80.0 wt %; in preferred embodiments, the polymer concentration in the polymer solution ranges from 5.0 wt % to 30.0 wt %; wherein the lower the polymer concentration is, the more efficiently the polymer seeps into pores inside the aerogel structure, and the low thermal conductivity and low-K dielectric polymer/aerogel composite or the polymer/fiber/aerogel composite contains higher porosity. Therefore, low thermal and low-K dielectric properties of the polymer/aerogel composite or the polymer/fiber/aerogel composite are more superior. On the contrary, the polymer concentration is the higher, and content ratio the polymer coating inside the silicon-based aerogel is higher, and the intensity of end-product is better. Therefore, adjusting concentration of the polymer solution allows controlling dielectric property and intensity of the low thermal conductivity and low-K polymer/aerogel composite or the polymer/fiber/aerogel composite. More preferably, the polymer concentration in the polymer solution ranges from 5.0 wt % to 30.0 wt %.

In the aforementioned method, when the polymer is a thermoplastic polymer, a thermoplastic polymer/aerogel composite or polymer/fiber/aerogel composite featuring of high intensity, high tensile strength, light-weighted and low-K dielectric property can be formed after solvent drying step (S6″) is accomplished. In particular, the thermoplastic polymer comprises polyethylene (PE), polypropylene (PP), polycarbonate (PC), polyamide (PA), polyesteramide (PEA), polyethylene terephthalate (PET), polytetrafluoroethylene (PTFE) or a combination thereof.

In some embodiments, the pure aerogel or the fiber/aerogel composite can be compounded with the polymer solution by techniques comprising injection, immersion, suction, spraying, impregnation or vacuum suction. In another aspect, when the polymer is a thermosetting polymer, a crosslinking-solidifying step (S7″) follows the solvent drying step (S6″), and a thermosetting polymer/aerogel composite or a thermosetting polymer/fiber/aerogel composite is obtained. Preferably, the thermosetting polymer comprises epoxy, polyimide (PI), polyetherimine (PEI), polyphenylene oxide (PPO), polyphenylene sulfide (PPS), polyetherketone (PEK), polyetheretherketone (PEEK) or a combination thereof.

Preferably, in the aerogel material, when content of aerogel molecules is higher or concentration of the polymer solution is thinner, the interior porosity is higher. Therefore, the aerogel material demonstrates low thermal conductivity, low dielectric constant and low dielectric loss, and transforming electric field energy into heat on a high-frequency condition is rendered difficult. On the other hand, physical properties such as intensity, tensile strength or rigidity of the aerogel material is lower. On the contrary, when content of aerogel molecules is lower or concentration of the polymer solution is higher, physical properties such as intensity, tensile strength or rigidity of the aerogel material is higher, but thermal conductivity, dielectric constant and dielectric loss are also higher. The method disclosed in the present invention realizes adjustment of thermal conductivity and dielectric properties through controlling contents of aerogel and concentration of the polymer solution.

At the solvent drying step (S6″), organic solvents in the polymer solution-containing pure aerogel composite or the polymer solution-containing fiber/aerogel composite is vaporized in an ambient environment at a solvent drying temperature. During the solvent drying process, the polymer solution inside the polymer solution-containing pure aerogel composite or the polymer solution-containing fiber/aerogel composite undergoes a liquid-solid phase separation. A solvent-rich phase and a polymer-rich phase are formed and during phase separation solvent of the solvent-rich phase is vaporized gradually. On the other hand, polymer chains of the polymer-rich phase coat on aerogel framework or fiber surface, and a polymer membrane layer is formed on a aerogel framework or a fiber structure. In some embodiments, the mixing solvent is ethanol and the solvent drying temperature ranges from 60° C. to 75° C. In other embodiments, the mixing solvent is butanone and the solvent drying temperature ranges from 80° C. to 90° C.; the mixing solvent is toluene and the solvent drying temperature ranges from 100° C. to 110° C. The aerogel material is not deformed when there is no large amount of bubbles produced as the solvent drying temperature is too high.

In some embodiments, when the polymer is a thermosetting polymer, the method further comprises a crosslinking-solidifying step (S7″): at a crosslinking-solidifying temperature, the thermosetting polymer is crosslinked with aerogel molecules so as to be solidified. When the thermosetting polymer is epoxy, the crosslinking-solidifying temperature ranges from 150° C. to 180° C., and 150° C. or 180° C. is preferred. When the thermosetting polymer is a polyimide, the crosslinking-solidifying temperature ranges from 120° C. to 325° C., and 120° C., 180° C., 260° C. or 325° C. is preferred. At the crosslinking-solidifying step (S7″), at a specific crosslinking-solidifying temperature, molecular chains of the thermosetting polymer coating on aerogel framework are crosslinked with silicon-based aerogel molecule. A crosslinking reaction occurs between polymer chains of the polymers coating on the aerogel framework, and bonding between polymers or between polymers and aerogel molecules is created so that a thermosetting polymer/aerogel composite or a thermosetting polymer/fiber/aerogel composite featuring of high heat resistance, high intensity, light weight and low-K dielectric property is obtained.

Figure 6:
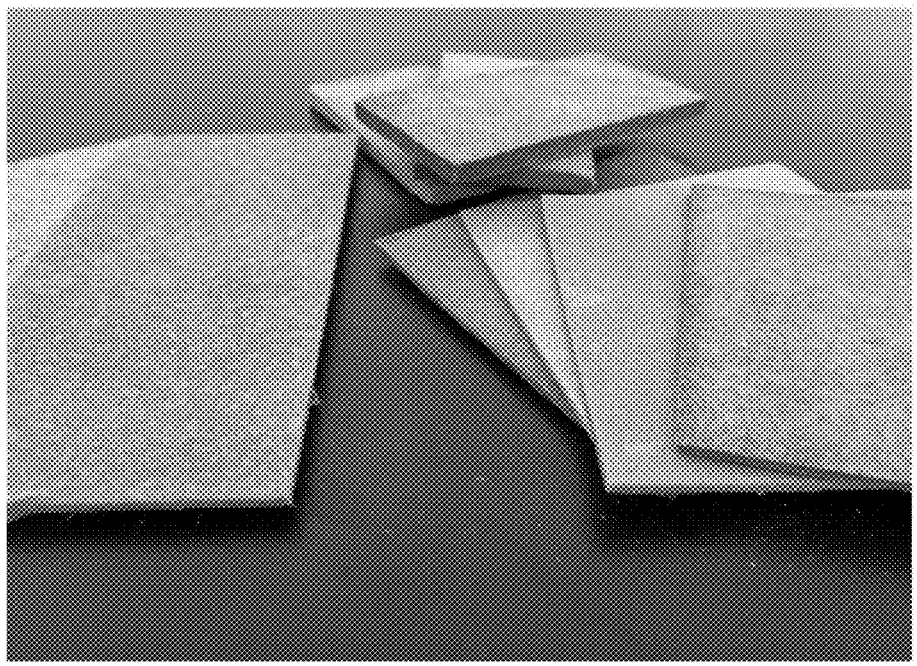
FIG. 6 is a photo demonstrating appearances of a low thermal conductivity and low-K dielectric aerogel material in the second embodiment.

Please refer to FIG. 6. Appearance of a low thermal conductivity and low-K dielectric aerogel material pad in a preferred embodiment is demonstrated in FIG. 6, wherein the aerogel material pad is a polyimide/aerogel composite or a polyimide/ceramic fiber/aerogel composite pad.

Figure 7:
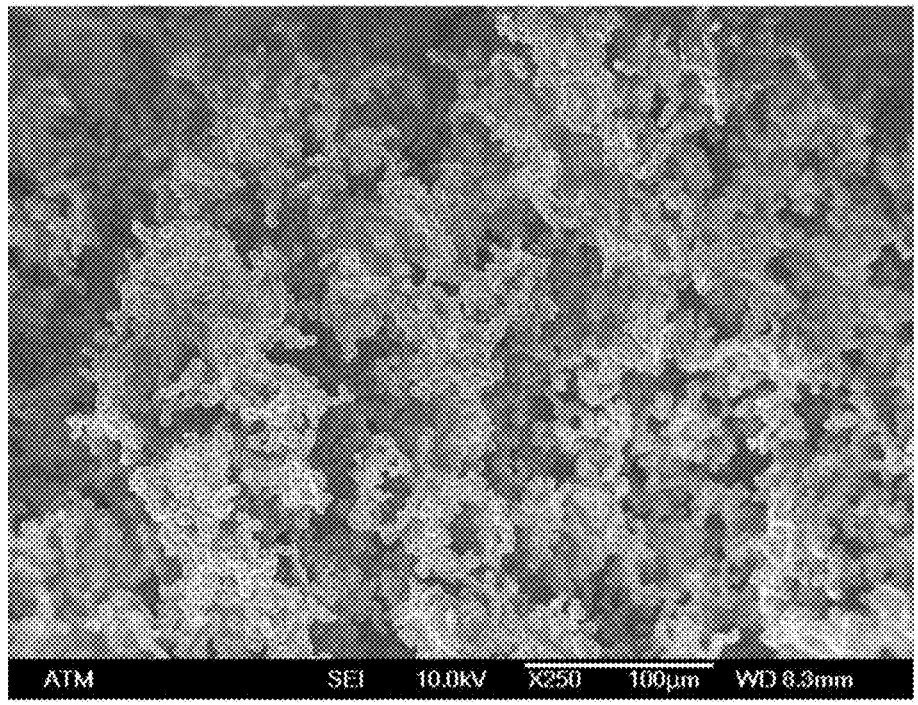
FIG. 7 is a 250×SEM photo showing cross section of the low thermal conductivity and low-K dielectric aerogel material in the second embodiment.

FIG. 7 is a 250×SEM photo showing cross section of the low thermal conductivity and low-K dielectric aerogel material in a preferred embodiment, which shows a microstructure of a multi-porous polyimide/aerogel composite pad. Polyimide coating on aerogel network structure forms a multi-porous polyimide/aerogel composite pad with a homogeneous appearance.

Figure 8:
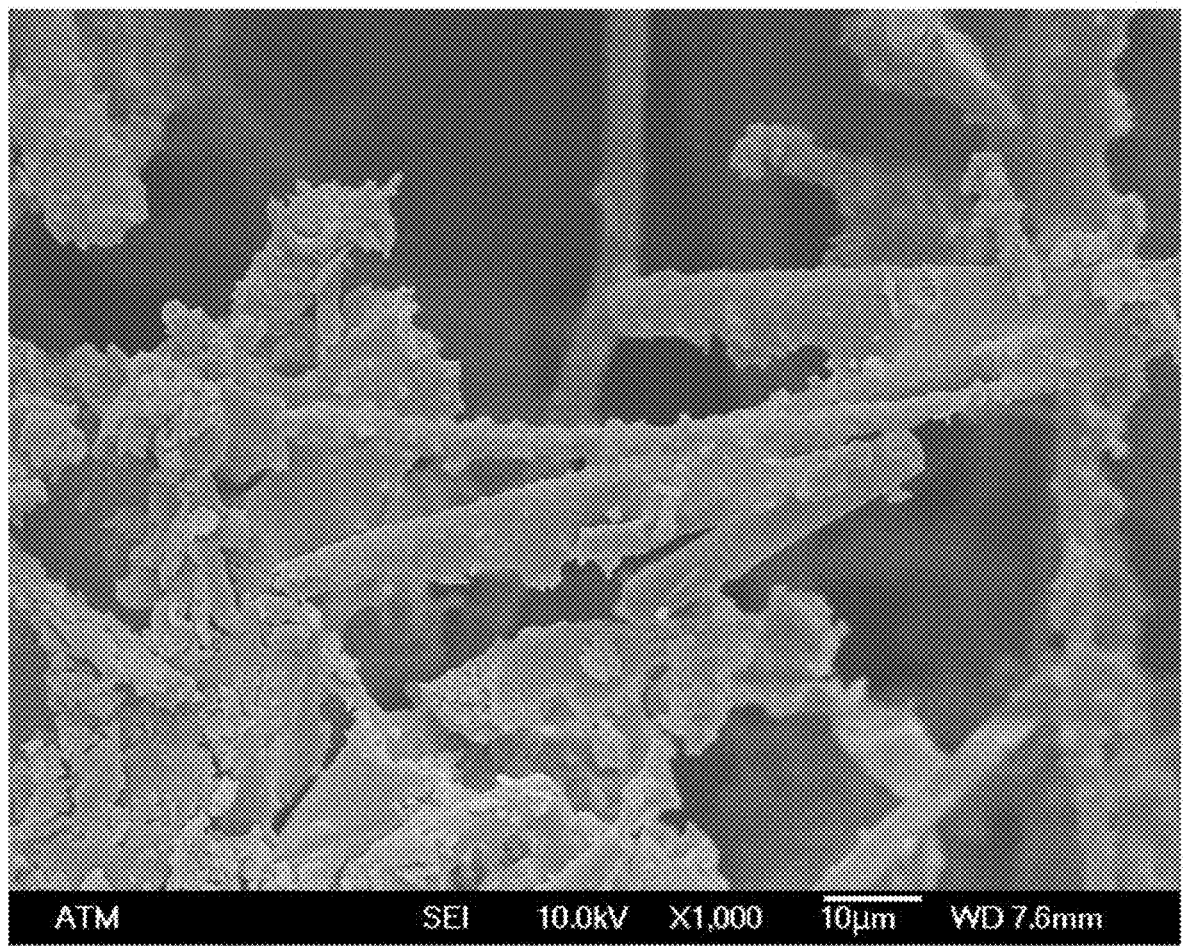
FIG. 8 is a 1000×SEM photo showing cross section of the low thermal conductivity and low-K dielectric aerogel material in the second embodiment.

Please refer to FIG. 8 which is a 1000×SEM photo showing cross section of the low thermal conductivity and low-K dielectric aerogel material in one preferred embodiment. As shown in FIG. 8, polyimide coats on ceramic fiber surface and aerogel network structure surface in a polyimide/ceramic fiber/aerogel composite pad. Through adhesive property provided by polyimide, the ceramic fiber can be firmly adhered to the aerogel clustering structure, and a polyimide/ceramic fiber/aerogel composite pad featuring of high intensity, high heat resistance and low-K dielectric property is prepared.

Please refer to TABLE 1. Physical properties of the ceramic fiber/aerogel composite pads impregnated by polymer solutions at various concentrations are listed in TABLE 1. In this example, the polyimide/ceramic fiber/aerogel composites are prepared by impregnating ceramic fiber/aerogel composites in 80 wt %, 50 wt %, 30 wt %, 20 wt % or 15 wt % polyimide solutions. Each polyimide/ceramic fiber/aerogel composite is designated as PI-80/CF/AC, PI-50/CF/AC, PI-30/CF/AC, PI-20/CF/AC, PI-15/CF/AC, respectively. In addition, a pure aerogel is designated as PA and a ceramic fiber/aerogel composite without polymer solution impregnation is designated as CF/AC.

TABLE 1

|  | Density (g/cm³) | Thermal conductivity coefficient (W/mk) | Test frequency (GHz) | $D_K$ | $D_F$ |
|---|---|---|---|---|---|
| PA | 0.123 | 0.0249 | 2 | 1.326 | 0.0025 |
|  | 0.123 | 0.0249 | 3 | 1.320 | 0.0024 |
|  | 0.123 | 0.0249 | 5 | 1.314 | 0.0026 |
|  | 0.123 | 0.0249 | 10 | 1.315 | 0.0026 |
| CF/AC | 0.204 | 0.0271 | 2 | 1.372 | 0.0034 |
|  | 0.204 | 0.0271 | 3 | 1.370 | 0.0034 |
|  | 0.204 | 0.0271 | 5 | 1.351 | 0.0032 |
|  | 0.204 | 0.0271 | 10 | 1.346 | 0.0026 |
| PI-15/ CF/AC | 0.366 | 0.0472 | 2 | 1.403 | 0.0037 |
|  | 0.366 | 0.0472 | 3 | 1.394 | 0.0037 |
|  | 0.366 | 0.0472 | 5 | 1.380 | 0.0036 |
|  | 0.366 | 0.0472 | 10 | 1.350 | 0.0033 |
| PI-20/ CF/AC | 0.461 | 0.0631 | 2 | 1.567 | 0.0047 |
|  | 0.461 | 0.0631 | 3 | 1.563 | 0.0046 |
|  | 0.461 | 0.0631 | 5 | 1.548 | 0.0044 |
|  | 0.461 | 0.0631 | 10 | 1.521 | 0.0041 |
| PI-30/ CF/AC | 0.538 | 0.1125 | 2 | 1.678 | 0.0078 |
|  | 0.538 | 0.1125 | 3 | 1.661 | 0.0077 |
|  | 0.538 | 0.1125 | 5 | 1.655 | 0.0074 |
|  | 0.538 | 0.1125 | 10 | 1.654 | 0.0073 |
| PI-50/ CF/AC | 0.678 | 0.1632 | 2 | 1.846 | 0.0125 |
|  | 0.678 | 0.1632 | 3 | 1.838 | 0.0121 |
|  | 0.678 | 0.1632 | 5 | 1.812 | 0.0120 |
|  | 0.678 | 0.1632 | 10 | 1.804 | 0.0114 |
| PI-80/ CF/AC | N/A | N/A | N/A | N/A | N/A |
|  | N/A | N/A | N/A | N/A | N/A |
|  | N/A | N/A | N/A | N/A | N/A |
|  | N/A | N/A | N/A | N/A | N/A |

As indicated in TABLE 1, density of the pure aerogel composite is 0.123 g/cm³, while density of the ceramic fiber/aerogel composite (CF/AC) is 0.204 g/cm³. Density of the polyimide/ceramic fiber/aerogel composite (PI/CF/AC) increases as concentration of the polyimide solution increases. Densities of PI-15/CF/AC, PI-20/CF/AC, PI-30/CF/AC and PI-50/CF/AC are 0.366 g/cm³, 0.461 g/cm³, 0.575 g/cm³ and 0.678 g/cm³, respectively. However, when concentration of polyimide solution rises up to 80 wt %, seepage of the polymer solution into aerogel becomes inhomogeneous. In addition, viscosity of polyimide solution increases critically such that during the process the aerogel material tends to crack or to dissociate into aerogel powder, and the aerogel material eventually becomes unable to form.

Moreover, thermal conductivity coefficient of the pure aerogel is 0.0249 W/mk and that of the ceramic fiber/aerogel composite is 0.0271 W/mk. The thermal conductivity coefficient increases as concentration of the polymer solution rises, and thermal conductivity coefficients of PI-15/CF/AC, PI-20/CF/AC, PI-30/CF/AC and PI-50/CF/AC are 0.0472 W/mk, 0.0631 W/mk, 0.1125 W/mk and 0.1632 W/mk, respectively. PI-80/CF/AC is unable to form during the manufacturing process and thus no thermal conductivity coefficient is measured.

Furthermore, the dielectric properties including $D_K$ and $D_F$ both decrease as test frequency decreases. However, when test frequency increases from 2 GHz to 10 GHz, $D_K$ of the pure aerogel decreases from 1.326 to 1.315 while $D_F$ of the pure aerogel increases from 0.025 to 0.026. As for CF/AC without polymer solution treatment, $D_K$ decreases from 1.372 to 1.346 and $D_F$ decreases from 0.0034 to 0.0026. As measured at test frequency of 10 GHz, $D_K$ and $D_F$ of the polyimide/ceramic fiber/aerogels both increase as concentration of the polymer solution increases. $D_K$ values of PI-15/CF/AC, PI-20/CF/AC, PI-30/CF/AC and PI-50/CF/AC are 1.350, 1.521, 1.654 and 1.804, respectively. $D_F$ values of PI-15/CF/AC, PI-20/CF/AC, PI-30/CF/AC and PI-50/CF/AC are 0.0033, 0.0041, 0.0072 and 0.0144, respectively. The ceramic fiber/aerogel composite and polymer/ceramic fiber/aerogel composite both present excellent dielectric properties, and the dielectric properties change as concentration of the polymer solution variates. Thus, physical properties of the aerogel material can be adjusted through manipulation of the polymer solution concentrations.

As illustrated in the embodiments and examples mentioned above, the method provided in the present invention realizes rapid preparation of a low thermal conductivity and low dielectric aerogel material at atmospheric pressure. The aerogel material can be in a form of a membrane, a pad, a chunk or a sheet, but not limited hereto. Moreover, the method provided in the present invention does not require a large amount of organic solvents such as alkanes, aromatics or benzenes, and thus time-consuming solvent displacement is omitted and supercritical drying equipment is not necessary, which simplifies the process and makes it safer and more cost-effective.

As is understood by a person skilled in the art, the aforementioned preferred embodiments of the present invention are illustrated of the present invention rather than limiting of the present invention. In view of the foregoing, it is intended to cover various modifications and similar arrangements included within the spirit and scope of the appended claims. Thus, the scope of which should be accorded the broadest interpretation in order to encompass all such modifications and similar structures.

What is claimed is:

1. A method for making a low thermal conductivity and low-k dielectric aerogel material, wherein the aerogel material comprises a pure aerogel, a fiber/aerogel composite, a polymer/aerogel composite, or a polymer/fiber/aerogel composite and the method comprising steps of:
   mixing and hydrolysis step: adding a siloxane precursor to an ethanol water solution to form a mixed solution and then adding an acid catalyst to the mixed solution to perform a hydrolysis reaction, wherein the siloxane precursor comprises a hydrophobic siloxane compound, a siloxane compound or a combination thereof;
   dispersion and condensation step: adding a dispersing solution to the mixed solution and then using an emulsifier or a stirring equipment to disperse the siloxane precursor to form a homogeneous sol, wherein the dispersing solution comprises a base catalyst;
   molding step: injecting the sol to a mold so as to promote the sol to further condense into a solid-like aerogel wet-gel structure, wherein the mold comprises a molding mold or a molding mold comprising a fiber;
   drying step: at atmospheric pressure, drying the solid-like aerogel wet-gel structure at a drying temperature so as to obtain the low thermal conductivity and low-k dielectric aerogel material with a homogeneous structure, wherein the drying temperature ranges from 60 to 150° C., the pure aerogel with thermal conductivity k ranging from 0.0113 to 0.018 W/(m·K), and the fiber/aerogel composite with thermal conductivity k ranging from 0.022 W/(m·K) to 0.032 W/(m·K); and
   polymer solution impregnating step: preparing a polymer solution and injecting the polymer solution into the low thermal conductivity and low-k dielectric aerogel material so that a polymeric chain penetrates homogeneously into interior of the low thermal conductivity and low-k dielectric aerogel material to form a polymer solution-containing pure aerogel composite or a polymer solution-containing fiber/aerogel composite, wherein the polymer solution comprises a polymer and a mixing solvent, and the polymer comprises a thermosetting polymer, a thermoplastic polymer, a liquid crystalline polymer or a combination thereof; and solvent drying step: placing the polymer solution-containing pure aerogel composite or the polymer solution-containing fiber/aerogel composite at a solvent drying temperature so as to vaporize the mixing solvent of the polymer solution, so that the polymer coats a network structure surface inside the pure aerogel or the fiber/aerogel composite or a fiber surface inside the fiber/aerogel composite to form the polymer/aerogel composite or the polymer/fiber/aerogel composite, wherein the solvent drying temperature ranges from 60 to 115° C.; wherein the polymer concentration in the polymer solution ranges from 0.01 wt % to 80.0 wt %.

2. The method as claimed in claim 1, wherein the drying step comprises steps of:

solvent vaporizing step: placing the solid-like aerogel structure at an azeotropic vaporizing temperature so that the ethanol water solution in the solid-like aerogel wet-gel structure accomplishes azeotropic vaporization, and then distilling and drying the ethanol water solution to obtain a half-dried aerogel structure, wherein the azeotropic vaporizing temperature ranges from 60 to 110° C.; and solvent bumping step: adjusting the azeotropic vaporizing temperature of the half-dried aerogel structure to a bumping temperature so that trace amount of a water of the ethanol water solution in the half-dried aerogel structure bumps with water molecules of the water of the ethanol water solution to produce a positive vapor pressure, and the positive vapor pressure produces micropores in the half-dried aerogel structure, wherein the bumping temperature ranges from 110 to 150° C.

3. The method as claimed in claim 1, wherein the siloxane compound comprises tetramethoxysilane (TMOS), tetraethoxysilane (TEOS) or the combination thereof; the hydrophobic siloxane compound comprises methyltrimethoxysilane (MTMS), methyltriethoxysilane (MTES) or the combination thereof, wherein in the siloxane precursor, a molar ratio of the siloxane compound to the hydrophobic siloxane compound ranges from 0:100 to 40:60.

4. The method as claimed in claim 1, wherein the ethanol water solution comprises (1) ethanol, and (2) deionized water, distilled water or secondary distilled water.

5. The method as claimed in claim 1, wherein the fiber comprises glass fiber, ceramic fiber, rock wool fiber, polypropylene fiber, nylon fiber or polyester fiber; wherein the fiber comprises multi-porous glyph, multi-porous paper, multi-porous blanket, multi-porous rope, multi-porous plate or a combination thereof.

6. The method as claimed in claim 1, wherein the low thermal conductivity and low-k dielectric aerogel material is a multi-porous structure with porosity ranging from 40.0 to 95%, density ranging from 0.180 to 0.600 g/cm$^3$, dielectric constant ranging from 1.20 to 1.87 and dielectric loss ranging from 0.0026 to 0.0078.

7. The method as claimed in claim 1, wherein the thermoplastic polymer comprises polyethylene, polypropylene, PTFE, polycarbonate, polyamide, polyamide, polyester, polyetherimide, polyphenylene ether, polyphenylene sulfide, polyether ketone or a combination thereof.

8. The method as claimed in claim 7, wherein the polymer concentration in the polymer solution ranges from 5.0 wt % to 30.0 wt %.

9. The method as claimed in claim 1, wherein the polymer is the thermosetting polymer, and the method further comprising a step of:

crosslinking-solidifying step: placing the polymer/aerogel composite or the polymer/fiber/aerogel composite at a specific crosslinking-solidifying temperature, and crosslinking the polymeric chain of the polymer coating the network structure surface and silica-based aerogel molecule to obtain a thermosetting polymer/aerogel composite or a thermosetting polymer/fiber/aerogel composite, wherein the thermosetting polymer/aerogel composite or the thermosetting polymer/fiber/aerogel composite features density ranging from 0.180 g/cm$^3$ to 0.600 g/cm$^3$.

10. The method as claimed in claim 9, wherein the polymer concentration in the polymer solution ranges from 5.0 wt % to 30.0 wt %.

11. The method as claimed in claim 10, wherein when the thermosetting polymer is epoxy, the crosslinking-solidifying temperature ranges from 150 to 180° C.

12. The method as claimed in claim 10, wherein when the thermosetting polymer is polyimide, the crosslinking-solidifying temperature ranges from 120 to 325° C.

13. The method as claimed in claim 9, wherein the thermosetting polymer comprises epoxy, polyimide, phenolic plastic ester, polymelamine-formaldehyde plastic ester or a combination thereof.

* * * * *